United States Patent

Kobayashi

Patent Number: 5,854,860
Date of Patent: Dec. 29, 1998

[54] IMAGE FILING APPARATUS HAVING A CHARACTER RECOGNITION FUNCTION

[75] Inventor: Shigetada Kobayashi, Tokyo, Japan

[73] Assignee: Canon Kabushiki Kaisha, Tokyo, Japan

[21] Appl. No.: 576,455

[22] Filed: Dec. 21, 1995

[30] Foreign Application Priority Data

Dec. 26, 1994 [JP] Japan .................................. 6-322399

[51] Int. Cl.$^6$ ...................................................... G06K 9/00
[52] U.S. Cl. ............................................ 382/305; 382/291
[58] Field of Search .................................. 382/305, 282, 382/291, 292; 358/403; 395/757; 704/231; 707/500

[56] References Cited

U.S. PATENT DOCUMENTS

| | | | |
|---|---|---|---|
| 5,099,340 | 3/1992 | Kamada et al. | 358/403 |
| 5,165,103 | 11/1992 | Takeda et al. | 382/305 |
| 5,265,242 | 11/1993 | Fujisawa et al. | 395/600 |
| 5,371,807 | 12/1994 | Register et al. | 382/159 |
| 5,557,789 | 9/1996 | Mase et al. | 382/187 |
| 5,563,964 | 10/1996 | Tanaka et al. | 382/305 |

*Primary Examiner*—Yon J. Couso
*Attorney, Agent, or Firm*—Fitzpatrick, Cella, Harper & Scinto

[57] ABSTRACT

When a document sheet image is stored in a storage medium, characters are recognized for the document sheet image to detect character codes and position information. The detected character codes and position information and the document sheet image are stored in the storage medium. When a desired image is retrieved from the storage medium and displayed on a display unit and a desired area on the display screen is designated, character codes of the characters contained in the image of the designated area are outputted in accordance with the coordinate information of the designated area and the stored coordinate information of the characters.

11 Claims, 5 Drawing Sheets

IMAGE FILING APPARATUS HAVING A CHARACTER RECOGNITION FUNCTION

BACKGROUND OF THE INVENTION

1. Field of the Invention

The present invention relates to an image filing apparatus having a character recognition function for characters of an input image.

2. Related Background Art

In a prior art electronic filing system, in registering an image, a document sheet is read by an image scanner and resulting image data and a key word for retrieval inputted from a keyboard are stored in a storage medium such as a hard disk or a magneto-optical disk, and in retrieving the image, an image retrieved by a retrieval word (key word) designated by a user through the keyboard is displayed and printed by a printer. When the key word is designated, the character in the image may be extracted by an OCR (optical character reader) process from the input image for use as the key word.

In the prior art system, however, the input image information is bit map data derived by reading a document with characters by the scanner and the retrieval data is text data comprising a set of character codes inputted by the user or derived by the OCR. Both are separate data and they are not positionally associated in the image.

Accordingly, in the image derived by the retrieval by inputting the key word, it is not possible to determine the relation between the retrieval key word and the image on the display screen or to use a desired range of character information of the retrieved image data as text data of other text file.

SUMMARY OF THE INVENTION

It is an object of the present invention to provide an image filing apparatus which eliminates the above problems.

It is another object of the present invention to provide an image filing apparatus which allows to output a desired portion of character code data in an image retrieved from a storage medium for use to other document.

It is other object of the present invention to provide an image filing apparatus which can indicate where in a retrieved image a key word used for the retrieval is located to allow the determination of a relation between the key word and the image.

Other objects of the present invention will be apparent from the following description and the accompanying drawings.

DETAILED DESCRIPTION OF THE PREFERRED EMBODIMENTS

An embodiment of the present invention will be explained in detail with reference to the accompanying drawings.

Figure 1:
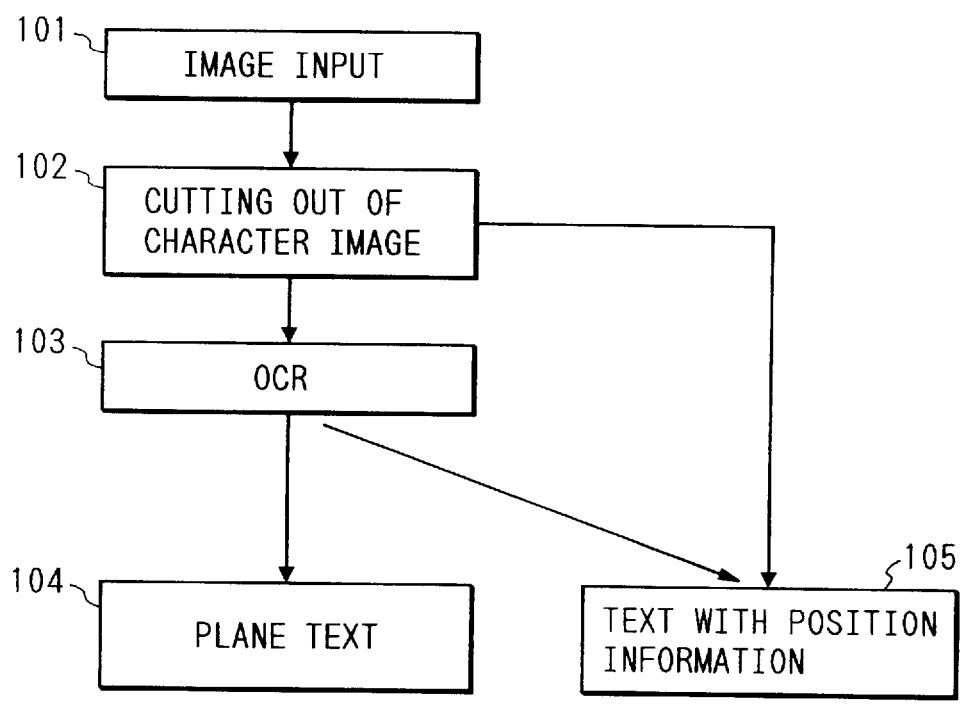
FIG. 1 shows a general procedure of a process in an embodiment of the present invention.

FIG. 1 shows a conceptual view of the present embodiment. In FIG. 1, numeral 101 denotes an image input unit which reads a document sheet image to produce a bit map image. Numeral 102 denotes a character image extraction unit which extracts a circumscribed rectangle of each character from the bit map image. Numeral 103 denotes a character recognition unit for recognizing each of the character images extracted by the character image extraction unit 102 and it infers a character code of the corresponding character image by comparing characteristic parameters derived from the character image with a dictionary table of preregistered characteristic parameters of characters. Numeral 104 denotes a plane text which comprises character codes of the entire document sheet image derived by the character recognition unit 103. Numeral 105 denotes a text with position information comprising position information in the entire image of the character images derived by the character image extraction unit 102 and the character codes.

Figure 3:
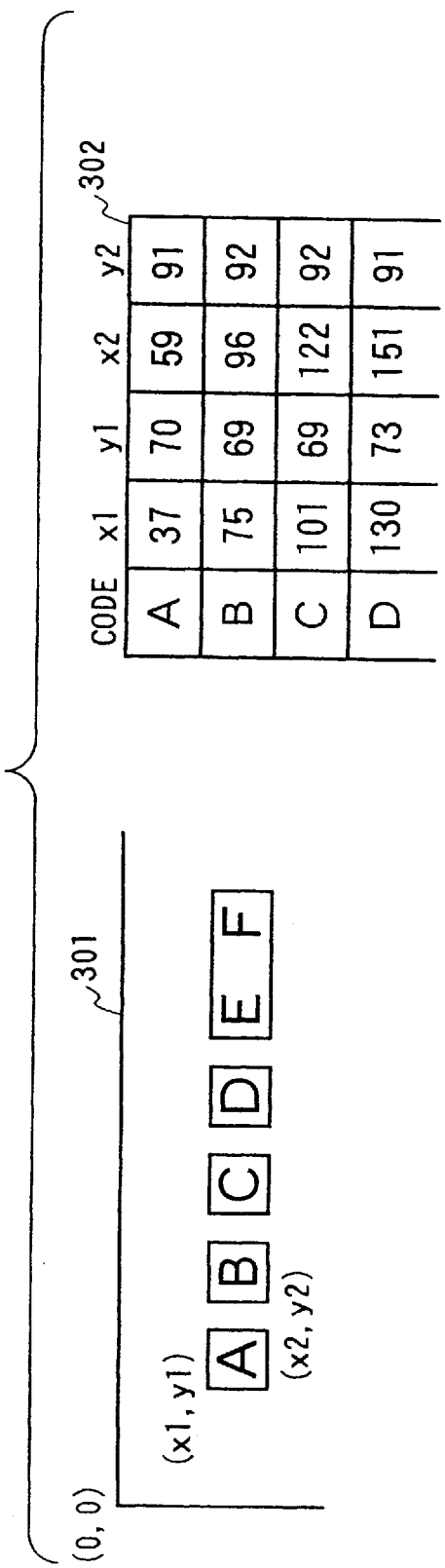
FIG. 3 illustrates position information of a character in the embodiment of the present invention.

Referring to FIG. 3, the position information is explained in detail. Numeral 301 denotes a chart showing circumscribed rectangles of a character image area in the bit map image developed in a memory and coordinates thereof. Coordinates of left top corner and right bottom corner of each character image are designated by (x1, y1) and (x2, y2), respectively, with left top of the bit map image being an origin point. Numeral 302 denotes a table of coordinate information shown in 301. For example, the table is structured to allocate two bytes to the character code and two bytes to each of x1, y1, x2 and y2, that is, a total of ten bytes. In the present embodiment, an input resolution of the scanner is 400 DPI and the coordinate information is represented by the number of dots in 400 DPI. This is expressed as the text data with position information 105 in FIG. 1. Alternatively, values in millimeter may be used. In this manner, the character codes and the coordinate information for all characters in the document sheet are prepared in the table.

Figure 2:
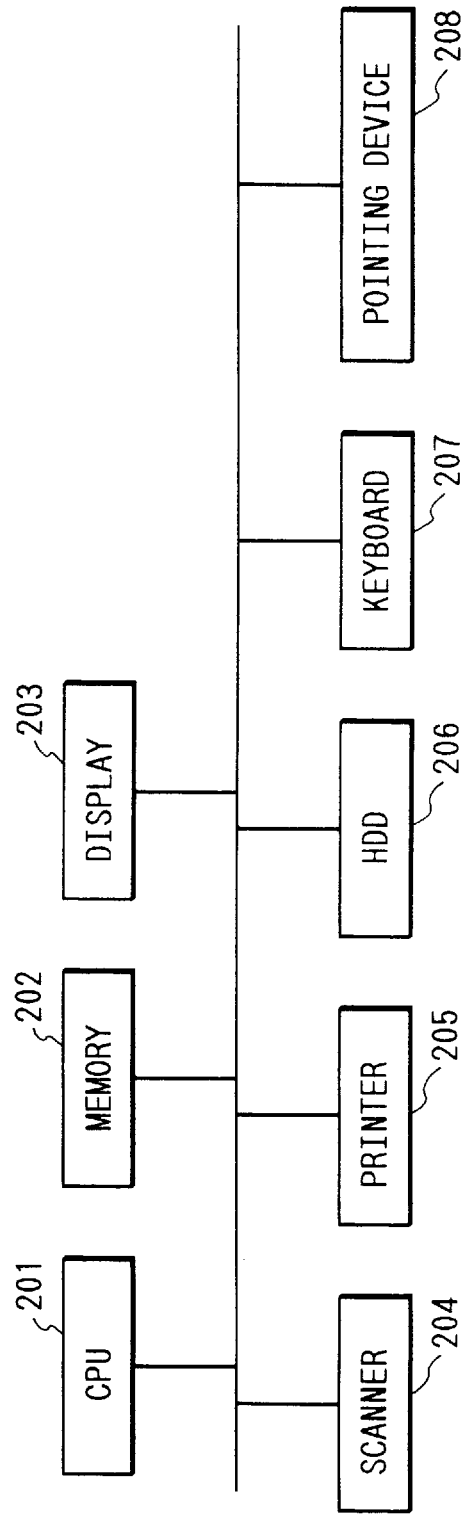
FIG. 2 shows a hardware configuration of the embodiment of the present invention.

FIG. 2 shows a general block diagram of a hardware of the electronic filing system in the present embodiment. Numeral 201 denotes a CPU for controlling the overall apparatus and numeral 202 denotes a RAM as a work area for the CPU 201. It also temporarily stores the table 302 of FIG. 3. Numeral 203 denotes a display for displaying an image. Numeral 204 denotes a scanner for reading a document sheet and numeral 205 denotes a printer for printing a retrieved image. Numeral 206 denotes a hard disk for storing an input image and the table temporarily stored in the RAM 202 and it may be a magneto-optical disk. Numeral 207 denotes a keyboard for inputting a retrieval key word and a command and numeral 208 denotes a pointing device for pointing an area on the image display.

Figure 4:
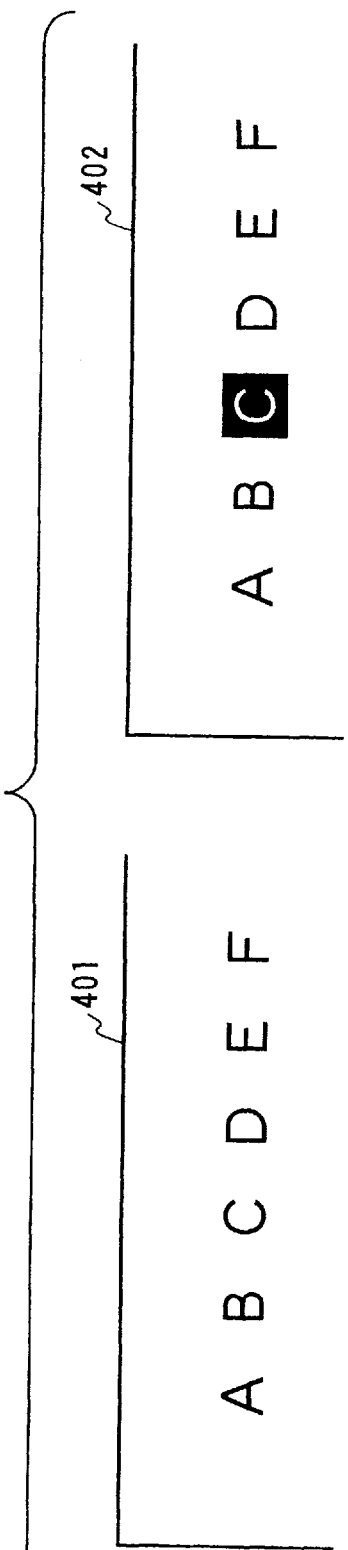
FIG. 4 illustrates a reversal process of a retrieval word in the embodiment of the present invention.

In FIG. 4, numeral 401 denotes an instance of display of a document retrieved by key word "C". In this instance, since the word "C" appears at a relatively front part of the document, it is easy to determine why this particular document was retrieved, but if it appears at a rear part of the document, it would be hard to determine. Thus, in order to enhance that the retrieval was done by the word "C", the area of the word "C" is reverse-displayed as shown by 402.

Figure 5:
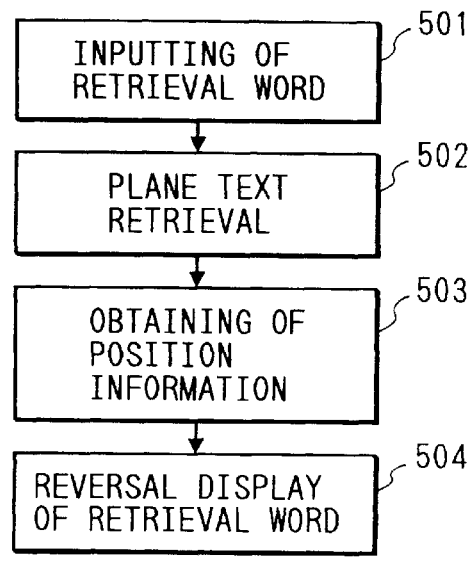
FIG. 5 shows a procedure of the reversal process of the retrieval word in the embodiment of the present invention.

FIG. 5 shows a procedure of the process. Numeral 501 denotes an input step of the retrieval key word. A key word for the retrieval is inputted. Numeral 502 denotes a plane text retrieval step. The plane text 104 in FIG. 1 is searched for the table of all documents stored in the hard disk 206 in accordance with the input retrieval key word. The list of the retrieved documents is displayed on the display 203. When an operator designates a desired document by the keyboard 207 or the pointing device 208, the number of characters from the top character of the designated document to the character string corresponding to the inputted retrieval key word is derived. Numeral 503 denotes a position information acquiring step. The position information of the corresponding character is derived in accordance with the text with position information of the structure shown by 107 in FIG. 1 and 302 in FIG. 3 and the number of characters to the character string derived in 502. Numeral 504 denotes an reversal display step of the retrieval word. When the designated document is displayed on the display 203, the image of the corresponding characters is reverse displayed on the display screen in accordance with the position information derived in 503. As a result, the display as shown by 402 in FIG. 4 is derived. The reversal display may be conducted by inverting (0→1, 1→0) the data of the corresponding rectangle area of a video RAM provided in the display 203.

Figure 6:
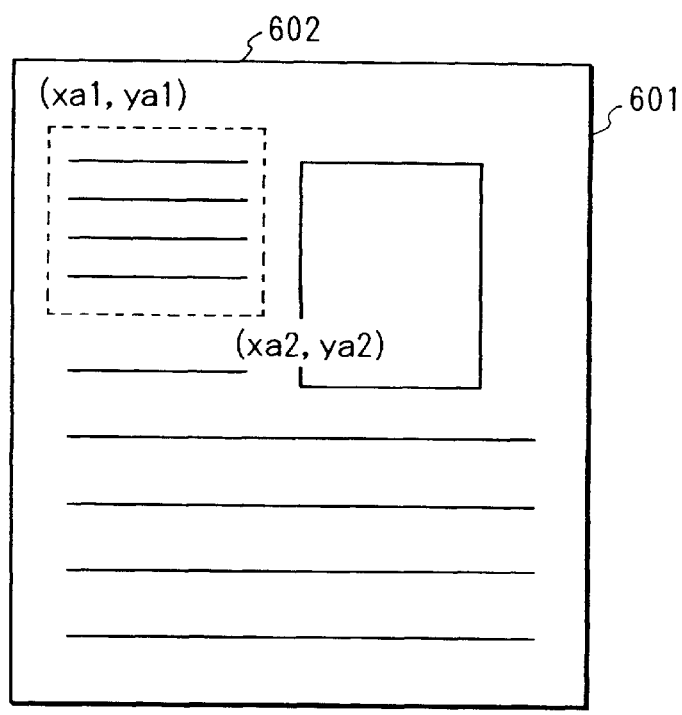
FIG. 6 illustrates the extraction of a text in a designated area in the embodiment of the present invention.
Figure 7:
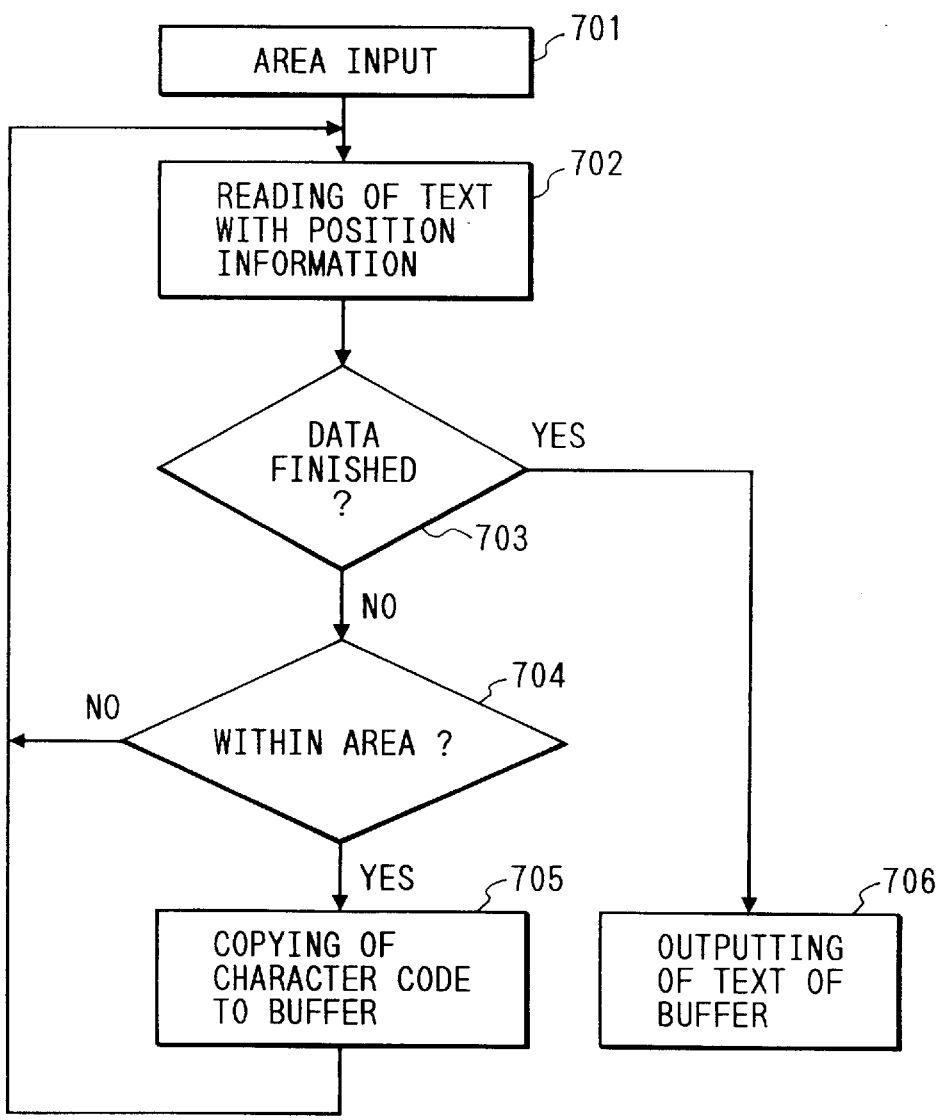
FIG. 7 shows a procedure of the extraction of the text in the designated area in the embodiment of the present invention.

FIG. 6 shows the extraction of the characters of the designated area on the display screen. A desired document is retrieved from the documents stored in the electronic filing system and any portion on the document image may be extracted to copy the text data in other application. Numeral 601 denotes one page of entire document displayed. A rectangle 602 encircled by broken lines denotes an area designated by the user by the pointing device 208. The area may be designated on the bit map image displayed on the display 203. FIG. 7 shows a procedure therefor. Numeral 701 denotes an area designation step. As shown in FIG. 6, the coordinates of the two points (xa1, ya1) and (xa2, ya2) representing the designated area are derived. A plurality of area may be designated. Numeral 702 denotes a step to read the text with position information shown by 302 in FIG. 3, one character data at a time from the table 302. In the present embodiment, ten bytes are read for each character. Numeral 703 denotes a decision step for the termination. When the process is terminated for all texts with position information, the process proceeds to 706 to terminate the process. Numeral 704 denotes a decision step to determine whether each of the read characters is in the designated area or not. If it is in the area, the character code is copied to a buffer in the RAM 202 in a copy step 705. If the read character is beyond the area, no action is taken and the next data is read. Numeral 706 denotes an output step for outputting the character codes held in the buffer as the text data of the designated area. The data held in the buffer may be stored in the file or copied to an intermediate buffer called a clip board.

In the above embodiment, the plane text and the text with position information are separately stored. When they are separated, the text with position information may comprise only the position information. Further, since the plane text for the retrieval may be generated from the text with position information in the above embodiment, only the text with position information may be stored. In this case, for each retrieval or extraction of the text of the designated area, the first two bytes of each record of the text with position information are read to generate the plane text.

Instead of previously preparing the text with position information the area to be extracted may be first designated and characters may be recognized for the image in the area to output the character codes.

In accordance with the present invention, since the retrieval key word area is reverse displayed on the display screen for the retrieved image, the key word contained in the retrieved image can be instantly determined so that whether it is the desired image or not can be readily determined.

Further, since the text data corresponding to the area designated on the display screen of the retrieved image can be readily extracted, the use thereof in other application is facilitated.

It should be understood that the present invention is not limited to the above embodiment but various modifications thereof may be made without departing from the claims.

What is claimed is:

1. An image filing apparatus comprising:
   image input means for inputting an image;
   recognition means for recognizing characters in the image input by said image input means;
   detection means for detecting a character code for each of the characters recognized by said recognition means and position information for each of the characters;
   storage means for storing the image and the character codes and position information of each character detected by said detection means, so as to maintain correspondence therebetween;
   retrieval means for retrieving a desired image stored in said storage means;
   display means for displaying the desired image retrieved by said retrieval means;
   designation means for designating an area on the desired image displayed by said display means; and
   output means for outputting the character codes for characters contained in the designated area of the desired image based on coordinates of the area designated by said designation means and based on the position information stored by said storage means.

2. An image filing apparatus comprising:
   input means for inputting retrieval information;
   retrieval means for retrieving an image from a storage medium in accordance with the retrieval information input by said input means, wherein the storage medium stores plural images, a character code of each character included in each stored image, and coordinate data for each character;
   designation means for designating an area of the image retrieved by said retrieval means; and
   character code output means for outputting a character code representing a character contained in the image of the area designated by said designation means based on the designated area and based on the coordinate data of the character stored in the storage medium.

3. An image filing apparatus according to claim 2, wherein said retrieval means retrieves the image based on the retrieval information input and based on the character code stored in the storage medium.

4. An image filing apparatus according to claim 2, wherein the character codes and the coordinate data are stored in said storage medium when the image is stored in said storage medium.

5. An image filing apparatus according to claim 2 wherein said character codes are generated by recognizing the characters contained in the image.

6. An image filing apparatus comprising:
   image input means for inputting an image;
   recognition means for recognizing characters in the image input by said image input means;
   detection means for detecting a character code for each of the characters recognized by said recognition means and position information for each of the characters;

storage means for storing the image and the character codes and position information of each character detected by said detection means, so as to maintain correspondence therebetween;

key word input means for inputting a retrieval key word;

retrieval means for retrieving an image stored in said storage means based on the retrieval key word input by said key word input means; and display means for displaying the image retrieved by said retrieval means based on the position information stored in said storage means, in a manner so as to discriminate an image of a character corresponding to the key word from the image of another character not corresponding to the key word.

7. A method for outputting character codes in an image filing apparatus, comprising the steps of:

inputting an image;

recognizing characters in the image to detect a character code for each character and position information for each character;

storing the image and the detected character codes and position information, so as to maintain correspondence therebetween;

retrieving and displaying a desired image;

designating an area in the displayed desired image; and outputting the character codes for the characters contained in the designated area of the desired image based on coordinates of the designated area and based on the stored position information.

8. A method for outputting character codes in an image filing apparatus, comprising the steps of:

inputting retrieval information;

retrieving an image from a storage medium in accordance with the input retrieval information, wherein the storage medium stores plural images, a character code of each character included in each image stored, and coordinate data for each character;

designating an area in the retrieved image; and outputting character codes representing a characters contained in the image of the designated area based on the designated area and based on the coordinate data of the character stored in the storage medium.

9. A method for outputting character codes according to claim 8, wherein in said retrieving step, the image retrieval is performed based on the retrieval information input and based on the character code stored in the storing medium.

10. A method for outputting character codes according to claim 8, wherein the character code and the coordinate data are stored in the storage medium when the image is stored in the storage medium.

11. A method for retrieving and displaying an image in an image filing apparatus, comprising the steps of:

inputting an image:

recognizing characters in the image to detect a character code for each of the characters and position information for each of the characters;

storing the image, and the character codes and the position information of each character detected, so as to maintain correspondence therebetween;

inputting a retrieval key word;

retrieving a stored image based on the input retrieval key word; and displaying the retrieved image based on the position information stored, in a manner so as to discriminate an image of a character corresponding to the key word from the image of another character not corresponding to the key word.

* * * * *

UNITED STATES PATENT AND TRADEMARK OFFICE
CERTIFICATE OF CORRECTION

PATENT NO. : 5,854,860

DATED : December 19, 1998

INVENTOR : Shigetada Kobayashi

It is certified that error appears in the above-identified patent and that said Letters Patent is hereby corrected as shown below:

COLUMN 1

Line 39, "allows to output" should read --allows output of--;
Line 41, "use to other document" should read --use in other document--; and
Line 42, "is other object" should read --is another object--.

COLUMN 3

Line 13, "an" should read --a--.

COLUMN 6

Line 4, "a characters" should read --a character--.

Signed and Sealed this

Tenth Day of August, 1999

*Attest:*

Q. TODD DICKINSON

*Attesting Officer*     Acting Commissioner of Patents and Trademarks